J. D. BENNETT.
CLAMP.
APPLICATION FILED APR. 23, 1919.
1,322,520.
Patented Nov. 25, 1919.
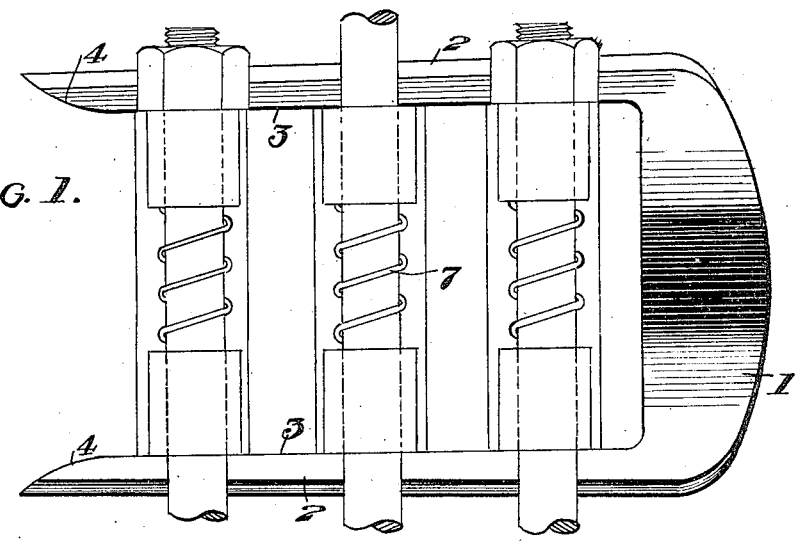
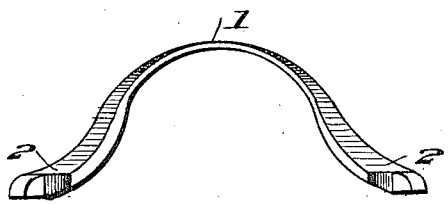
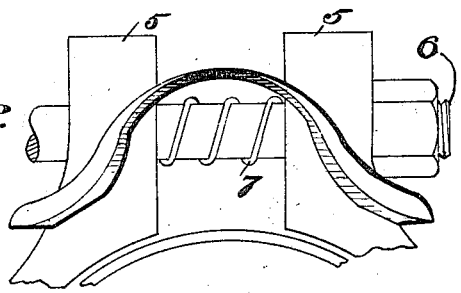
WITNESSES
INVENTOR
J. D. BENNETT
BY
ATTORNEYS

UNITED STATES PATENT OFFICE.

JOHN DAVID BENNETT, OF CONNEAUT, OHIO.

CLAMP.

1,322,520.   Specification of Letters Patent.   Patented Nov. 25, 1919.

Application filed April 23, 1919. Serial No. 292,229.

*To all whom it may concern:*

Be it known that I, JOHN DAVID BENNETT, a citizen of the United States, and a resident of Conneaut, in the county of Ashtabula and State of Ohio, have invented certain new and useful Improvements in Clamps, of which the following is a specification.

My invention is an improvement in clamps, and has for its object to provide a clamp especially adapted for holding the transmission bands of a planetary transmission during assembling, wherein the clamp is so arranged that the pressure on the band will be equalized during the assembling.

In the drawings:

Figure 1 is a plan view showing the clamp in use;

Fig. 2 is a view of Fig. 1, looking at one end;

Fig. 3 is an end view of the clamp.

In the present embodiment of the invention, the improved clamp is a substantially U-shaped member consisting of a body 1 and arms 2 extending laterally from the body in substantial parallelism, and the inner edges of the arms, as shown at 3, are parallel with each other. At the free ends of the arms the surfaces 3 at the inner edges are rounded off, gradually merging into the outer edges of the arms as indicated at 4.

The body is arched laterally away from the plane of the clamp, as shown more particularly in Figs. 2 and 3, and the improved clamp is used as shown in Figs. 1 and 2. The ends 5 of the transmission bands, through which are passed the rods 6, are engaged at their outer sides by the arms 2 of the clamp, as shown in Fig. 1. Thus the springs 7 between the lugs are compressed, and the bands are tightened on the disks of the transmission.

All of the bands are held in approximately the same position and may be so held until the transmission is fully assembled. Afterward the clamp is drawn longitudinally of the axis of the disks, thus releasing the arms 2 from the band. The arched form of the body facilitates the removal of the clamp, since it permits the body to be grasped and easily drawn away.

I claim:

A clamp of the character specified comprising a substantially U-shaped member consisting of a body and arms extending laterally from the body, the inner edges of the arms being parallel, and the inner corners of the free ends of the arms being rounded for the purpose specified, the body of the clamp being arched laterally away from the plane of the clamp.

JOHN DAVID BENNETT.